US009662624B2

(12) United States Patent
Depierri et al.

(10) Patent No.: US 9,662,624 B2
(45) Date of Patent: May 30, 2017

(54) SYSTEM AND METHOD FOR PROVIDING A CONTINUOUS FLOW OF CATALYST INTO A POLYOLEFIN REACTOR

(75) Inventors: Robert G. Depierri, Baton Rouge, LA (US); J. Charles Dabadie, Baton Rouge, LA (US); N. Frank Cook, III, Jackson, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 516 days.

(21) Appl. No.: 13/510,420

(22) PCT Filed: Dec. 22, 2009

(86) PCT No.: PCT/US2009/069179
§ 371 (c)(1),
(2), (4) Date: Jul. 3, 2012

(87) PCT Pub. No.: WO2011/078850
PCT Pub. Date: Jun. 30, 2011

(65) Prior Publication Data
US 2012/0275931 A1    Nov. 1, 2012

(51) Int. Cl.
*F04C 2/107* (2006.01)
*B01J 8/00* (2006.01)
(Continued)

(52) U.S. Cl.
CPC .......... *B01J 8/002* (2013.01); *B01J 19/2435* (2013.01); *C08F 10/00* (2013.01); *F04C 2/1071* (2013.01);
(Continued)

(58) Field of Classification Search
CPC .... F04C 2/1073; F04C 2/1071; F04C 11/003; F04C 15/0038; B01J 8/002; B01J 19/2435
(Continued)

(56) References Cited
U.S. PATENT DOCUMENTS 2,512,765 A * 6/1950 Byram .................... 417/44.1
2,579,200 A * 12/1951 Mattix et al. ............. 417/20
(Continued)

FOREIGN PATENT DOCUMENTS

EP    1 563 902    8/2005
WO   02/062462    8/2002
(Continued)

*Primary Examiner* — Charles Freay
*Assistant Examiner* — Philip Stimpert
(74) *Attorney, Agent, or Firm* — Leandro Arechederra, III

(57) ABSTRACT

Both a catalyst feed system and a method are provided for providing a flow, of a mud-like catalyst slurry into a polyolefin reactor. The system includes a pressurized reservoir of the catalyst having an outlet, and a progressive cavity pump including a stator and a rotor. The pump stator has an inlet connected to the reservoir outlet, and an outlet leading to the polyolefin reactor. In operation, the reservoir is first pressurized to a level a little higher than the pressure of the reactor. The outlet of the reservoir is opened and the progressive cavity pump is actuated. The pressure drop generated across the catalyst slurry contained in the reservoir by the pump causes the slurry diluent to flow between the interstices of the particles of catalyst. The thick, mud-like catalyst slurry is quickly transformed into a much less viscous, syrup-like slurry that flows from the reservoir outlet to the inlet of the pump stator. The progressive cavity pump then continuously conveys the catalyst through the stator outlet and into the reactor.

14 Claims, 6 Drawing Sheets

(51) Int. Cl.
  *B01J 19/24*    (2006.01)
  *C08F 10/00*    (2006.01)
  *F04C 11/00*    (2006.01)
  *F04C 15/00*    (2006.01)

(52) U.S. Cl.
  CPC ... *B01J 2208/00752* (2013.01); *F04C 11/003* (2013.01); *F04C 15/0038* (2013.01)

(58) Field of Classification Search
  USPC .............................................. 417/20, 410.3
  See application file for complete search history.

(56) References Cited

U.S. PATENT DOCUMENTS

| | | | |
|---|---|---|---|
| 4,610,574 A | | 9/1986 | Peters |
| 5,746,435 A | * | 5/1998 | Arbuckle ...................... 277/304 |
| 6,261,199 B1 | * | 7/2001 | Schlangen ................... 475/163 |
| 6,908,971 B2 | | 6/2005 | Burns et al. |
| 2005/0272891 A1 | * | 12/2005 | Fouarge et al. .............. 526/943 |

FOREIGN PATENT DOCUMENTS

| WO | 2004/094489 | 11/2004 |
|---|---|---|
| WO | 2006/026493 | 3/2006 |

\* cited by examiner

US 9,662,624 B2

SYSTEM AND METHOD FOR PROVIDING A CONTINUOUS FLOW OF CATALYST INTO A POLYOLEFIN REACTOR

PRIORITY CLAIM

This application is a National Stage Application of International Application No. PCT/US2009/069179 filed Dec. 22, 2009, which is hereby incorporated by reference in its entirety.

FIELD OF THE INVENTION

This invention generally relates to catalyst feed systems for polyolefin reactors, and is specifically concerned with a system and method for providing a continuous flow of particulate catalyst to such a reactor by the use of a progressive cavity pump.

BACKGROUND OF THE INVENTION

Polyolefin reactors are used for the commercial production of a number of polyolefin compounds, such as polyethylene. In such reactors, for example loop-type reactors, the monomer and optional comonomers to be polymerized are mixed with a diluent such as isobutane and subjected to heat and pressure while circulating through the loops of the reactor. To initiate the polymerization process, a catalyst is introduced into the circulating mixture of monomers and diluent. Once polymerization is initiated, an effluent is formed comprising a slurry of particulate polymer solids suspended in the reaction diluent and unreacted monomers.

Many of the catalysts used to initiate polymerization are particulate in form. Often, such catalysts comprise an active catalytic compound coated over an inert carrier particle. Such a catalyst is generally known as a particulate-supported catalyst. While there are many different types of particulate-supported catalysts, one example that is presently used for the production of polyethylene comprises chromium oxide impregnated in a carrier particle of silica, which may have an average diameter ranging anywhere between about 20 micrometers to 150 micrometers.

Such a particulate-supported catalyst, in dry form, is sand-like in its physical properties. Consequently, in order to facilitate the introduction and uniform distribution of such a catalyst into the pressurized reactor, it is often mixed with some amount of a diluent to form a slurry. The slurry may be fed into the reactor one of two ways, i.e. via a dosing feeder or in a more diluted liquid form via a slurry feeder.

When a dosing feeder is used, the particulate catalyst is mixed with a small amount of diluent such as isobutane used as the diluent in the polymerization effluent. Such mixing is performed in what is known as a "mud pot" in the art by merely pouring the sand-like particulate catalyst and a small volume of diluent together without agitation. The particulate catalyst settles to the bottom of the "mud pot" to form a highly packed, viscous, mud-like slurry. The thick catalyst slurry is conveyed to the mud-pot outlet via a gravity feed into a dosing chamber located in a feeder leading to the reactor. The dosing chamber is movable from a loading position where it receives the mud-like catalyst slurry from the mud-pot outlet, to an unloading position within the feeder where it is opened to release a slug of catalyst slurry into a flow of diluent and from then on to a flow of effluent in the reactor.

As disclosed in U.S. Pat. Nos. 4,610,574 and 6,908,971, when a slurry feeder is used, the particulate catalyst is mixed with a larger volume of diluent (such as isobutane used as the diluent in the polymerization effluent) in a separate agitation vessel outside of the reactor to form a more dilute, much less viscous catalyst slurry. The diluted catalyst slurry is continuously stirred in the agitation vessel to prevent the sand-like particulate catalyst from settling out of the diluent. The resulting diluted catalyst slurry is pumped usually by way of a positive displacement type pump into a conduit leading into the reactor.

SUMMARY OF THE INVENTION

Applicants have observed that the dosing feeder often provides undesirably non-uniform concentrations of catalyst within the reactor loop during the operation of the reactor. This is particularly true when the frequency of releasing slugs of catalyst into the reactor approaches one of the multiples of loop circulation frequency (i.e. the time required for the volume of the reactor to pass through the reactor's circulation pump). In such a case, the catalyst tends to non-uniformly accumulate in localized regions of the circulating polymer slurry. Regions with high concentrations of catalyst will thicken and overheat and create large particles and strings of polymer that can foul the guide vanes and pumps in the reactor that circulate the effluent. Alternatively, the inconsistent density of slurry within the reactor can cause pumping instability and ultimately loss of pumping. Loss of pumping can cause reactor plugging and result in an extended down time. Moreover, irregularities in the flow of the viscous, mud-like catalyst from the gravity outlet of the mud-pot to the dosing chamber can cause variations in the amount of catalyst contained in the slugs, thus causing variations in the over-all polymerization rate. The resulting inconsistencies in polymerization rates can result in production losses, particularly when attempting to run the reactor at maximum rates. Finally, the flow of diluent to such feeders that is necessary to flush the catalyst slurry out of the dosing chamber and into the reactor sometimes causes fouling problems which can render the dosing feeder inoperative. Such fouling stems from the fact that the diluent used is typically recycled from the reactor due to the high flow rates of about 5 gallons (or 19 liters) per minute. Because such recycled diluent sometimes includes small amounts of monomer (examples are ethylene and/or hexene) as a result of an upset of one of the plant's distillation columns, enough polymerization can take place within the dosing feeder mechanism to "glue" its moving parts together, necessitating expensive plant downtime to effect repairs.

By contrast, the more diluted, less viscous form of catalyst slurry used in the slurry feeder permits the use of a positive displacement type pump that provides a more consistent flow of catalyst to the reactor. However, it is a capital intensive system requiring an agitated slurry vessel and associated mixing mechanisms and control systems. Such a vessel and mixing mechanism are necessary since the slurry must be continuously agitated and controlled to a consistent density to prevent the sand-like particulate catalyst from settling out of the carrier liquid. Also, because the pressure within the slurry vessel is typically less than the pressure within the reactor for such a feeder to be practical, slurry feeders are vulnerable to occurrences of the reactor effluent back-flowing into the slurry feed system. Such back-flowing in turn can cause the feeder or other parts of the feed system to become plugged and fouled. Other shortcomings include reliability problems associated with the agitator and pump, as well as the concentration of catalyst in the flow stream being too dilute to be accurately measured with conventional mass flow meters. Moreover, the use of a piston-type pump in such slurry feeders still delivers the slurry catalyst in pulses which result in some inhomogeneity in the distribution of catalyst throughout the reactor.

The invention is a system that is capable of providing a controlled flow, continuous or intermittent, of a particulate catalyst to a polyolefin reactor that overcomes all of the aforementioned shortcomings associated with dosing feeders and slurry feeders. "Controlled," as used herein, whether continuous or intermittent, means reduced irregularities in the flow of the viscous, mud-like catalyst from the gravity outlet of the mud-pot to the dosing chamber as compared to alternate pumping systems. This reduction in irregularities reduces variations in the amount of catalyst contained in the catalyst mud delivered to the reactor, thus reducing variations in the over-all polymerization rate. To this end, the catalyst feed system of the invention comprises a pressurized reservoir of such a particulate catalyst in the form of a mud-like concentrated slurry having an outlet, and a progressive cavity pump including a stator having an inlet connected to the reservoir outlet, an outlet connected indirectly to the polyethylene reactor, and a rotor disposed within the stator. The inventive system stems from applicants' discovery that the initial, very high viscosity of mud-like forms of particulate catalysts can be dramatically reduced when (1) a moderate pressure drop is vertically applied across such a thick slurry, and (2) the outlet of the reservoir is opened.

The application of these two conditions unexpectedly transforms a highly viscous, mud-like form of catalyst into a syrup-like liquid that can be easily pumped. Initially, applicants believe that the slurry catalyst is in a stiff, and highly viscous form as a result of the individual particles of catalyst settling and packing in the diluent. In such a static and settled state, the surface irregularities of the particles tend to interlock, creating a slurry as stiff as settled wet sand on a beach. Applicants believe that the transformation of the stiff slurry catalyst into a much less viscous form occurs as a result of the applied pressure drop and opened outlet pulling enough of the slurry diluent through the interstices of the particles of catalyst to effectively "unlock" adjacent particles of catalyst from one another, thus dramatically reducing the viscosity of the catalyst slurry.

In operation, the reservoir is pressurized to a level a little higher than the pressure of the reactor while the outlet is opened and the progressive cavity pump is actuated. The mud-like catalyst slurry is quickly transformed into a pumpable slurry at some point between the reservoir outlet and the inlet of the pump stator. The progressive cavity pump then continuously conveys the catalyst at a steady rate through the stator outlet and into the reactor. The pumping action between the rotor and elastomeric interior of the stator not only continuously delivers a catalyst at a uniform rate to the reactor, but further delivers the particulate catalyst in an undamaged form (i.e. without breaking up the particles or reducing the catalyst particle size), and further results in far less frictional wear in the interior of the pump than would be the case if another type of positive displacement pumps (such as a piston pump) was used.

To further insure a steady flow rate of catalyst through the pump, the pump may include a simple catalyst slurry agitating member between the reservoir outlet and the inlet of the progressive cavity pump. The catalyst agitating member is preferably formed from a distal portion of the rotor that extends beyond the stator and engages and stirs the catalyst slurry as it enters the inlet of the stator. The provision of such an agitation member insures that the viscosity of the catalyst slurry flowing into the stator inlet has been lowered to a level that permits the progressive cavity pump to effectively pump the catalyst slurry.

The progressive cavity pump may further include a drive train connected between the output shaft of a motor and the proximal end of the rotor. Preferably, the drive train includes a worm gear to prevent the pump rotor from rotating in response to pressure applied by the catalyst slurry when the pump motor is not in operation, although a rotary ratchet mechanism could also be used. A drive shaft may be connected between an output shaft of said drive train and the proximal end of the rotor. A mechanical seal preferably surrounds the drive shaft. The mechanical seal may be a dual tandem mechanical seal that includes a bushing connected to a source of pressurized catalyst diluent pressurized at a pressure slightly more than the pumped liquid (1-10 psi) to prevent entry of catalyst slurry into the seal.

The system further may further include both a pump speed controller for adjusting the speed of the pump motor to maintain a preselected flow rate of catalyst, and a reservoir pressure controller that controls the pressure of the slurry at the suction of the pump to a level above an internal pressure of the reactor. The pump speed controller may include a digital controller operably connected to both the pump motor, and an output of a mass flow meter located downstream of the pump outlet that measures the flow of catalyst slurry discharged by the pump. The reservoir pressure controller may include a pressure differential transmitter operably connected between the outlet of the reservoir of catalyst slurry and the reactor, and electrically connected to digital controller which in turn is connected to a valve which controls the admission of pressurized diluent into the reservoir.

The system pump may further include a second rotor connected to a distal end of said first rotor, a second inlet in the stator upstream of said first inlet, and a reservoir of catalyst diluent connected to the second inlet of said stator, such that the progressive cavity pump pumps a mixture of catalyst slurry and diluent in a fixed volumetric ratio regardless of the rotational speed of the first and second interconnected rotors.

Finally, in all embodiments of the system of the invention, a recycled diluent flush may be provided between the pump outlet and the reactor inlet to facilitate the flow of catalyst slurry to the reactor. Because the diluent flush is located downstream of the progressive cavity pump, there is no opportunity for pump fouling caused by polymerization of monomer impurities in the recycled diluent.

In the method of the invention, the pressure of the reservoir of catalyst slurry is preferably adjusted within a range such that (1) it is higher than that of the reactor and (2) the net pressure drop at the pump outlet is minimal to zero. The fulfillment of the first condition insures there will be no backflow of reactor effluent into the catalyst reservoir, thus preventing fouling in the pump and the reservoir, while the fulfillment of the second condition advantageously reduces the work load and wear on the progressive cavity pump and allows it to function as more of a catalyst metering device than a pump. In practice, such a balance has been achieved when the pressure of the catalyst slurry reservoir is adjusted to a level between about 5 to 25 psi (or 0.34 to 1.72 bars) higher than the internal pressure of the reactor.

Next, the outlet of the reservoir is opened and the progressive cavity pump is actuated. The resulting draw-down and flow of catalyst diluent through the interstices of the particles of catalyst dramatically reduces the viscosity of the mud-like catalyst and initiates a continuous flow of catalyst slurry into the reactor.

Finally, the flow of catalyst is continuously monitored by the mass flow meter downstream of the pump, but upstream of the diluent flush and compared to a selected flow rate by the digital controller, which adjusts the rate of the pump motor until the measured flow rate corresponds to the selected flow rate.

DETAILED DESCRIPTION OF THE INVENTION

Figure 1:
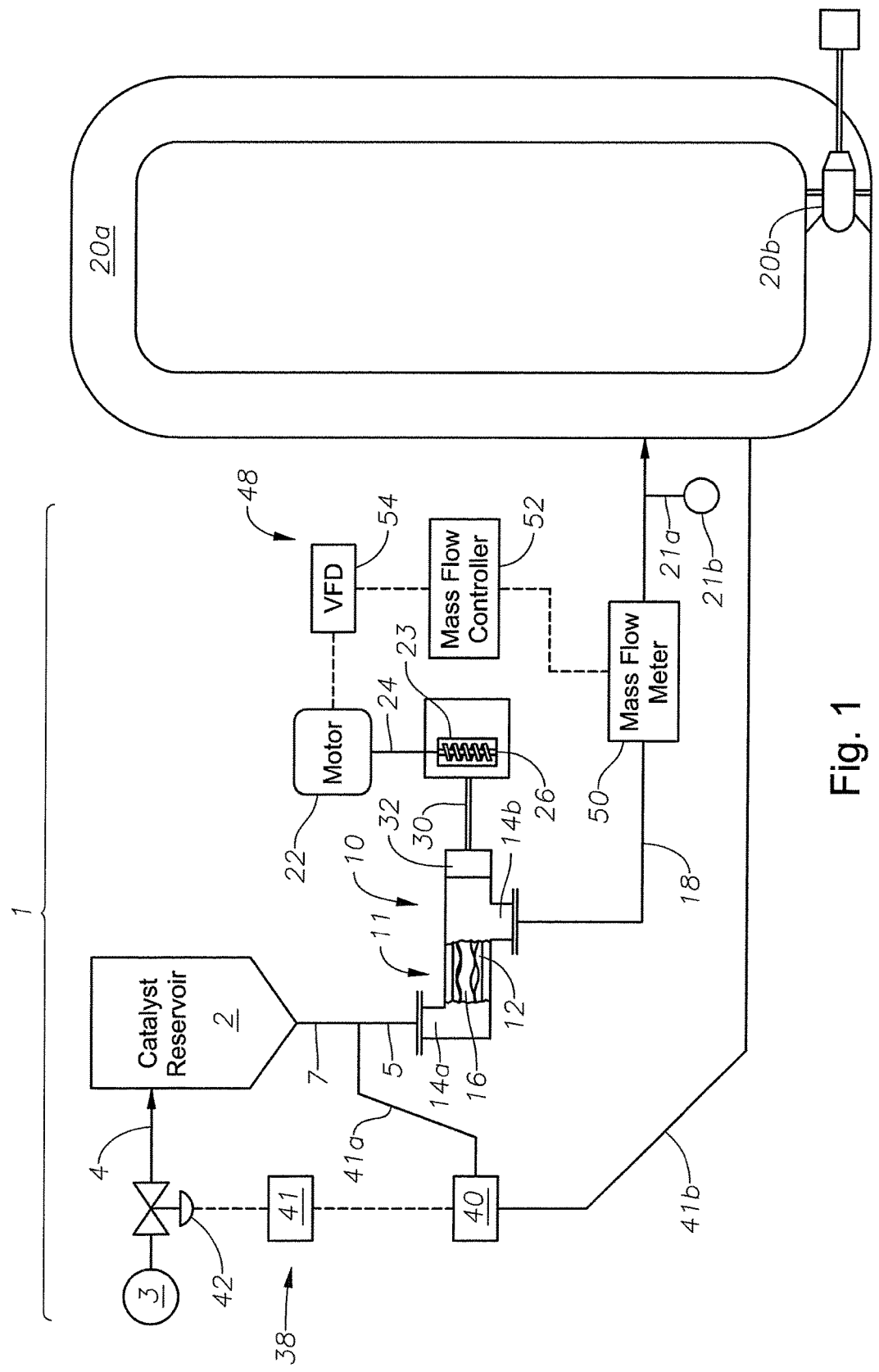
FIG. 1 is a schematic view of the catalyst feed system of the invention.

With reference now to FIG. 1, the catalyst feed system 1 of the invention includes a reservoir 2 for containing a supply of mud-like catalyst slurry. Reservoir 2 is connected to a source 3 of pressurized diluent via a conduit 4. Reservoir 2 further has an outlet 5 located at the distal end of a discharge conduit 7. The system 1 further includes a progressive cavity pump 10 having a stator and rotor assembly 11. The stator 12 of the assembly 11 includes an inlet 14a connected to the outlet 5 of the reservoir 3, and a discharge outlet 14b. A rotor 16 rotates within the inner diameter of the stator 12 to pump catalyst slurry through the outlet 14b and the outlet pipe 18 to one of the loops 20a of a polyolefin reactor. Reactor loop 20a includes a pump 20b for circulating reactor effluent during the manufacture of a polymer. A flush line 21a connected to a source of recycled, pressurized diluent 21b is connected to the outlet pipe 18 for expediting the flow of catalyst slurry to the circulating effluent in the reactor loop 20a. The progressive cavity pump 10 further includes a motor 22 for turning the rotor 16. The motor 22 is indirectly connected to the drive shaft via a drive train 23. The drive train 23 is constructed so that it is incapable of rotating in response to torque applied to the rotor 16 from pressurized catalyst slurry. Accordingly, in this example of the system 1, the output shaft 24 of the motor 22 is connected to a drive train 23 that includes a worm gear 26, although any one of a number of other mechanisms (such a rotary ratchet) could also be used. A mechanical seal 32 (described in more detail hereinafter) prevents catalyst slurry from leaking from the stator and rotor assembly 11 to the drive shaft 30. As will be described in more detail hereinafter, a pressurized, mechanical seal flush is provided between the shaft and the mechanical seal 32 to prevent pressurized catalyst slurry from entering the seal 32.

The system 1 has a pressure differential controller 38 for controlling the pressure within the catalyst reservoir 2. The pressure differential controller 38 includes a differential pressure sensor 40 connected to both the outlet 5 of the reservoir 2 and the inside of the reactor loop 20 via conduits 41a, 41b, respectively. The output of the differential pressure sensor 40 is electrically connected to a digital pressure differential controller 41, which in turn is electrically connected to electrically-controlled pressure valve 42. The system 1 also has a pump speed controller 48. Controller 48 includes a mass flow meter 50, which is preferably a coriolis-type flow meter, connected to the outlet pipe 18 of the pump 10. The output of the mass flow meter 50 is electrically connected to a digital mass flow controller 52, whose output is in turn electrically connected to the variable-frequency drive 54 of the pump motor 22.

Figure 2:
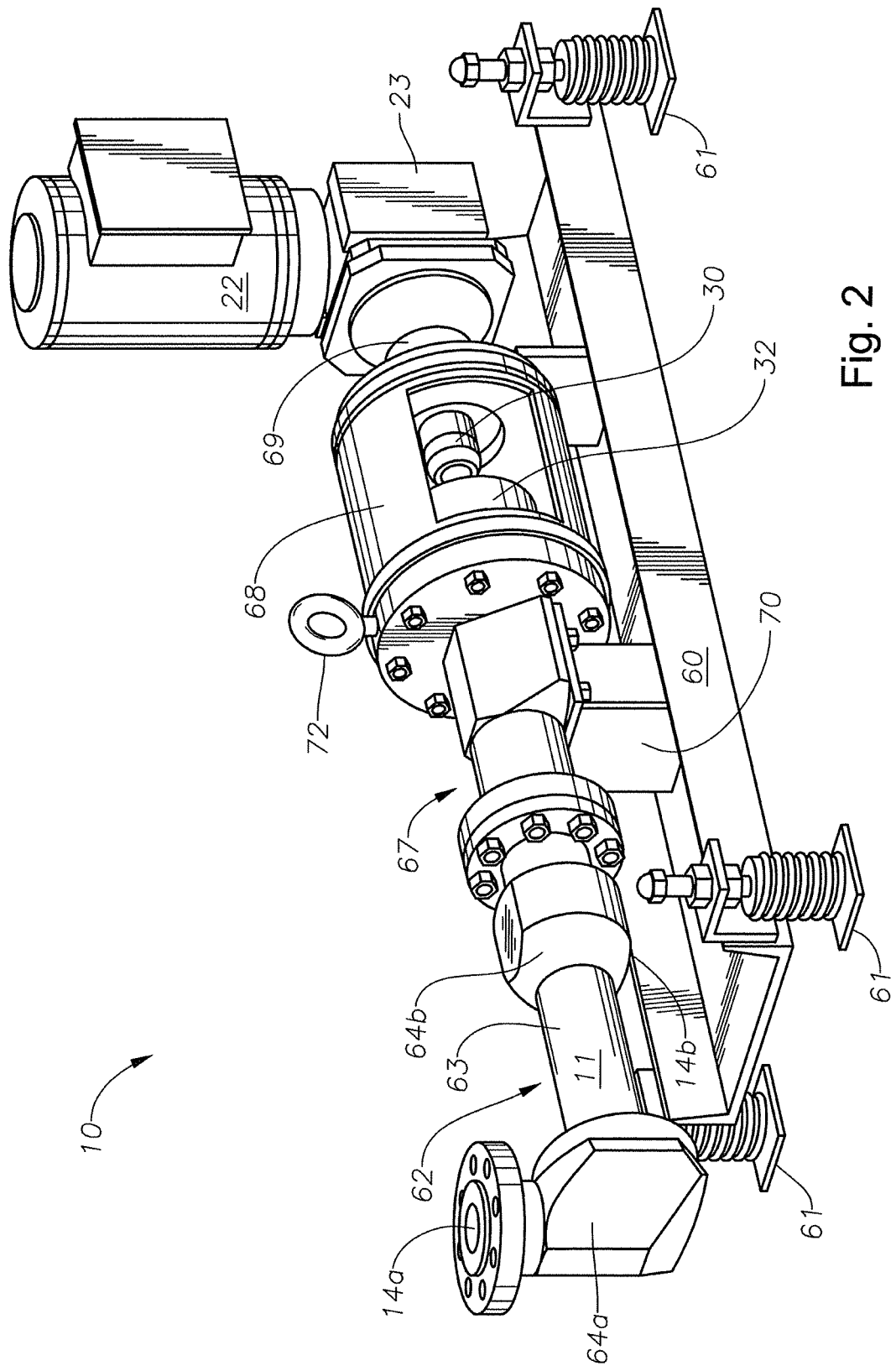
FIG. 2 is a perspective view of the progressive cavity pump used in the system of the invention.

With reference now to FIG. 2, the progressive cavity pump 10 of the system 1 is mounted on a frame 60 supported by four, vibration-absorbing feet 61. In order for the pump 10 to withstand the 600 psi pressures that the catalyst slurry applies to its interior, all of the pump components subjected to such pressures are effectively encapsulated in thick-walled, tubular material. In particular, the stator 12 of the stator-rotor assembly 11 includes a relatively thick-walled stator outer housing 63 that includes a tube 64 with inlet and outlet couplings 64a, 64b on either side. The tube 64 is concentrically disposed around a thinner-walled, tubular inner stator housing 65 (shown in FIG. 3A). Similarly, a relatively thick-walled joint shaft housing 67 is connected to the outlet coupling 64b of the stator outer housing 63. A housing 68 for the mechanical seal 32 is connected between the joint shaft housing 67 and a drive shaft housing 69. All of the pump components downstream of the mechanical seal 32 are effectively isolated from the high pressure of the catalyst slurry, and need not be designed to withstand any unusual pressures. A support column 70 is provided between the joint shaft housing 67 and the frame 60 to support the housing and the stator-rotor assembly 11. A hoisting bolt 72 is provided at the end of the mechanical seal housing 68 at the center-of-mass of the pump 10.

Figure 3A:
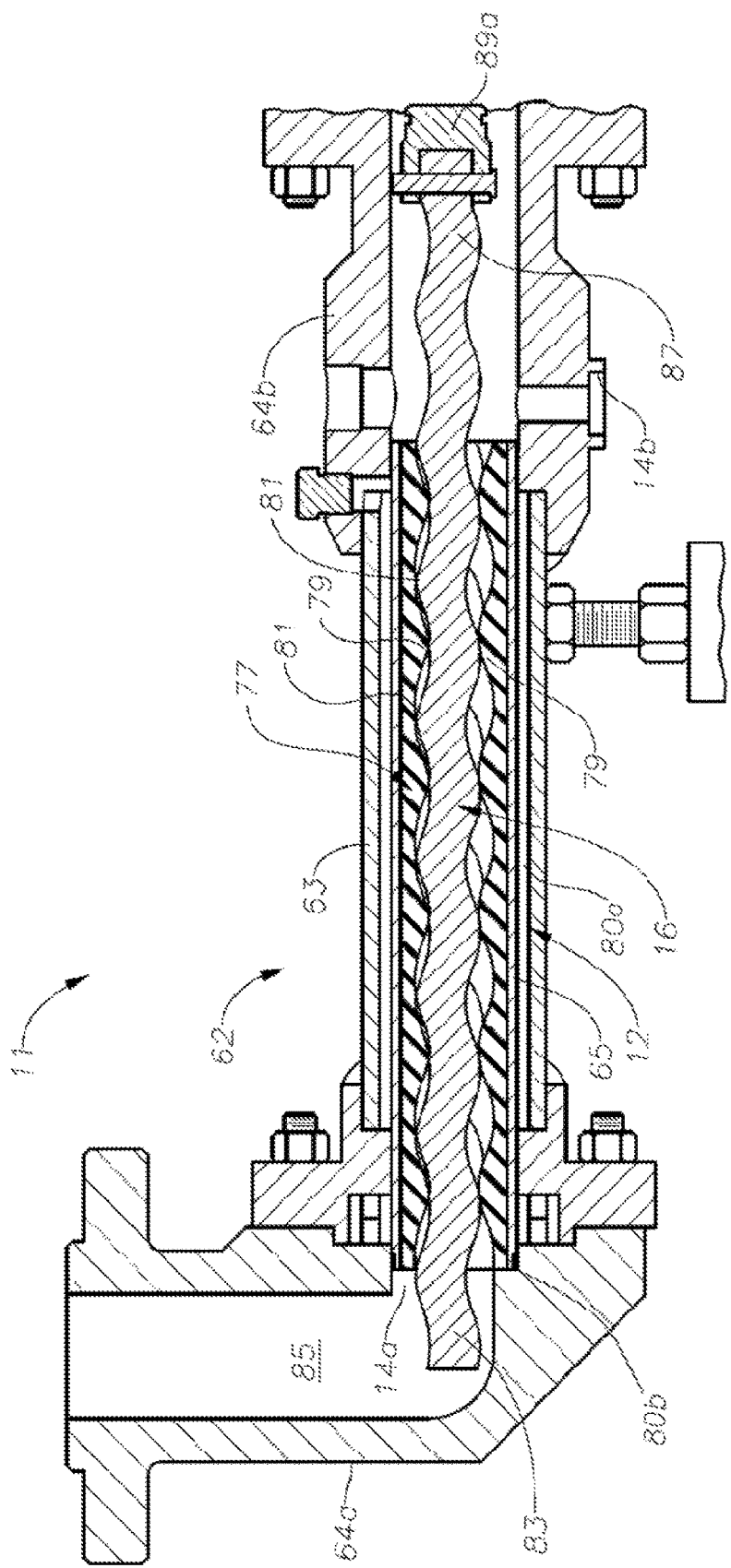
FIG. 3A is a side, cross sectional view of the stator and rotor assembly of the pump illustrated in FIG. 2.

With reference now to FIG. 3A, the stator inner housing 65 contains an elastomeric sleeve 77 having a double-helix profile 79. An annular space is provided between the tube 64 of the outer stator housing 63 and the inner stator housing 65 such that the two housings are concentric, but non-contacting. Annular space is connected to the pressurized catalyst slurry entering the inlet 14a via a very small annular opening about 0.002 inches (or 0.051 mm) wide between the inner stator housing 65 and the inner surface of the outlet coupling 64b in order to equalize the pressure acting on the inner and outer surfaces of the inner stator housing 65 and the elastomeric sleeve 77 contained within it. This small opening "strains" the catalyst slurry so that substantially only the catalyst diluent is admitted into the annular space, which is typically isobutane. The elimination of any pressure gradient along the radius of the elastomeric sleeve 77 and thin-walled inner stator housing 65 prevents any compression, warpage or buckling that might otherwise occur in the sleeve 77 during operation.

The rotor 16 also includes a helical profile 81. When the rotor 16 rotates in an eccentric fashion relative to the elastomeric sleeve 77, liquid-trapping cavities are formed which convey the catalyst slurry from the inlet 14a to the outlet 14b of the stator 12. The distal end 83 of the rotor 16 extends beyond the end of the elastomeric sleeve 77 into the interior 85 of the inlet joint 64a disposed between the outlet 5 of the catalyst reservoir and the inlet 14a of the stator. The proximal end 87 of the rotor 16 likewise extends beyond the sleeve 77 and in to the outlet coupling 64b, where it is connected to a universal joint 89a. During operation of the pump 10, the distal end 83 advantageously agitates the catalyst slurry as it enters the stator inlet 14a, thus insuring that the catalyst slurry is in a pumpable, relatively low viscosity state before being captured by the moving cavities formed between the rotating rotor 16 and elastomeric sleeve 77 of the stator 12. The pumped slurry is conveyed to the outlet coupling 64b, where it exits the stator outlet 14b.

Figure 3B:
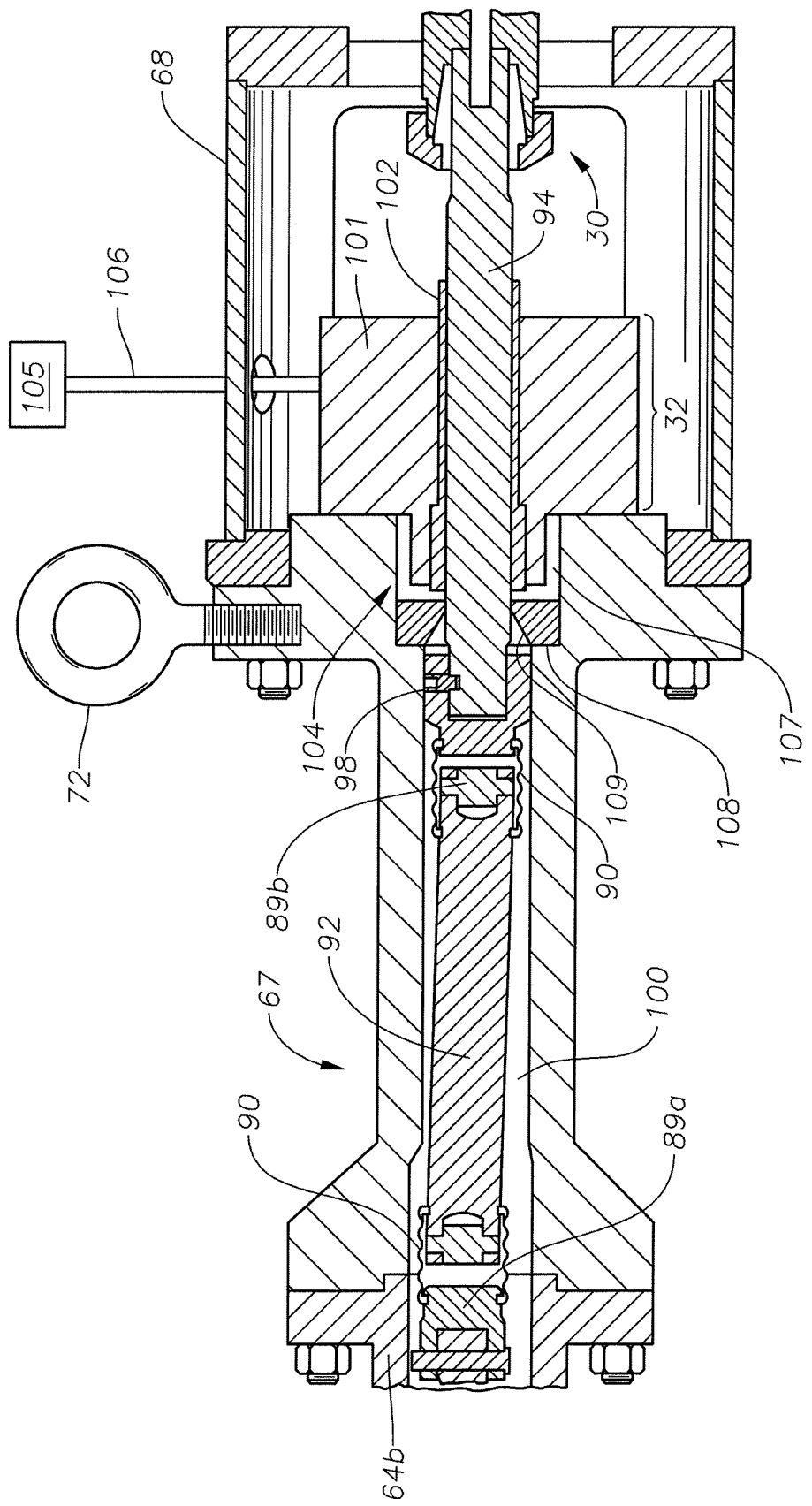
FIG. 3B is a side, cross sectional view of the drive shaft and mechanical seal of the pump illustrated in FIG. 2.

With reference to FIG. 3B, the joint shaft housing 67 contains a joint shaft 92 that accommodates the eccentric rotation of the rotor 16 to which it is connected. To this end, joint shaft 92 is connected at one end to the rotor 16 via the previously mentioned universal joint 89a, and to a seal shaft 94 at its other end by way of another, identical universal joint 89b. Both the universal joints 89a, 89b are covered by rubber boots 90 packed with grease to prevent the intrusion of the abrasive catalyst slurry. A key bolt 98 connects the universal joint 89b with the seal shaft 94. Sufficient tubular space 100 is provided between the inner surface of the joint shaft housing 67 and the outer surface of the joint shaft 92 to prevent contact during the operation of the pump 10.

The previously-mentioned mechanical seal 32 surrounds the seal shaft 94 as shown. The mechanical seal is preferably a dual-mechanical seal comprising a cylindrical, stationary portion 101 connected to the seal housing 68, and a sleeve-like portion 102 connected to the seal shaft 94. The sleeve-like portion 102 has a plurality of ring-like protrusions disposed within complementary-shaped annular grooves in the stationary cylindrical portion 101. The ring and groove surfaces are spring loaded in a manner known in the art so as to engage one another in a fluid tight seal during the operation of the pump 10.

A pressurized, mechanical seal flush 102 is provided between the joint shaft 92 and the mechanical seal 32 to prevent pressurized catalyst slurry from entering the seal 32. The seal flush 102 includes a source 105 of diluent pressurized to at least the same level as the catalyst slurry exiting the pump outlet 14b. The pressurized diluent from source 105 is connected to the cylindrical, stationary portion 101 of the seal 32 via a conduit 106. The cylindrical, stationary portion 101 has passageways (not shown) that in turn conduct the pressurized diluent to an annular space 107 disposed between the seal 32 and the joint shaft housing 67. A throttle bushing 108 having a conical recess 109 circumscribing the upstream end of the seal shaft 94 is disposed between the annular space 108 and the joint shaft housing 67. In operation, the seal flush 104 continuously supplies pressurized diluent to the annular space 107, which in turn is expelled upstream through the interface between the conical recess 109 of the throttle bushing 108 and the seal shaft 94. The constant stream of pressurized diluent advantageously prevents catalyst slurry from entering the seal 32.

It should be noted that the provision of (1) the mechanical seal flush 102 upstream of the mechanical seal 32 in combination with (2) the previously-described annular space 80a and annular opening 80b between the outer and inner stator housings 63, 65 that equilibrate the radial pressure gradient across the elastomeric sleeve 77 allow the progressive cavity pump 10 of the invention to able to pump liquids, and in particular abrasive slurries at of between about 200-700 psi (13.79 to 48.26 bars) or even higher. Additionally, when a slurry is being pumped, the small width of the annular opening 80b advantageously allows the diluent component of a pumped slurry to enter the annular space 80a while straining out the particulate component of the slurry, which in this example of the invention is a particulate catalyst slurry.

Figure 3C:
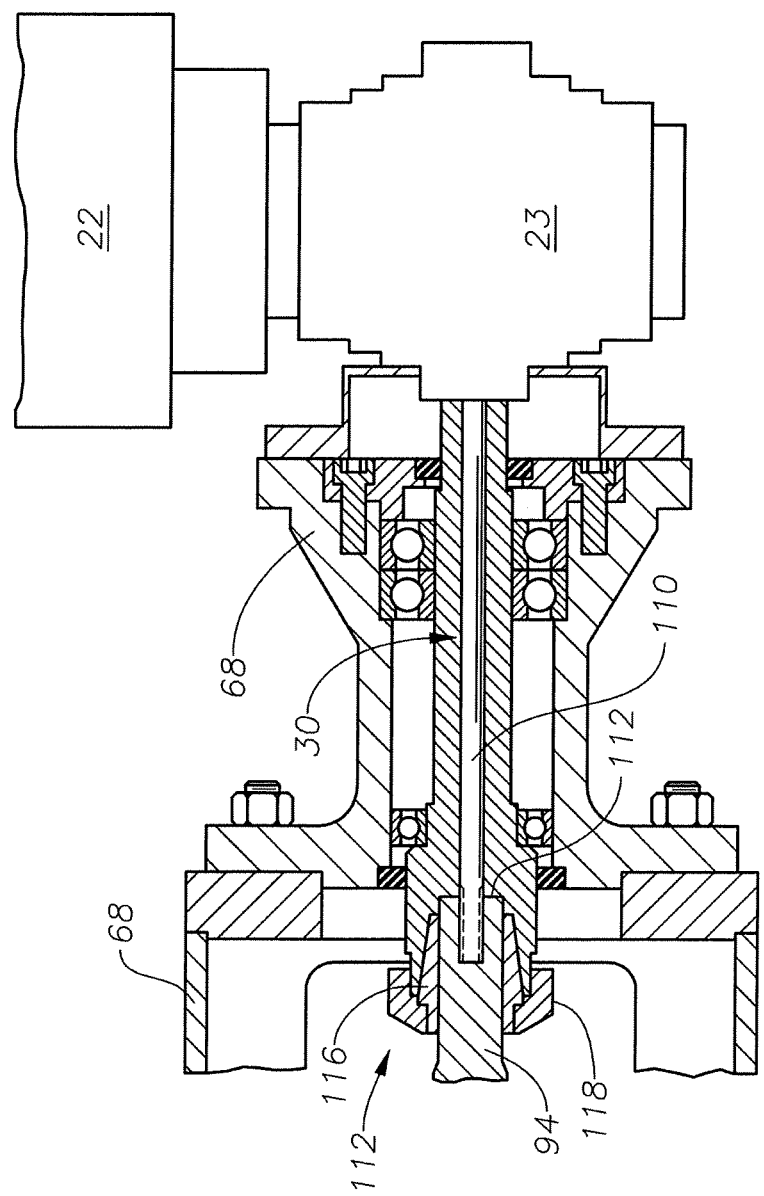
FIG. 3C is a side, cross sectional view of the motor, gear train and drive shaft of the pump illustrated in FIG. 2.

With reference to FIG. 3C, the drive shaft 30 is connected to the seal shaft 94 by means of a draw bolt 110 that pulls the downstream end of the seal shaft in to a frustro-conical recess 112 in the drive shaft. A collar assembly 114 formed from the combination of a conical sleeve 116 and a compression nut 118 wedgingly and concentrically secures the seal shaft 94 to the drive shaft 30.

The method of the invention will now be described with reference primarily to FIG. 1. In the first step of the method, the reservoir pressure controller 38 preferably adjusts the pressure of the catalyst reservoir to a level such that the pressure drop across the pump 10 is substantially zero. Such a setting reduces the work load and wear on the progressive cavity pump 10 to essentially zero, allowing it to perform more as a catalyst slurry metering device than a pumping device, and advantageously lowering the rate of wear of the internal surfaces of the stator-rotor assembly 11. Additionally, the potential for unintended flow through the pump 10 (in either direction) is minimized. Also, if the pump 10 does not have to generate any pressure, it can be shorter (i.e. the stator 12 and rotor 16 do not need to define as many cavities). Often after such an adjustment, the internal pressure of the catalyst reservoir 2 is slightly higher than that of the reactor loop 20a i.e. between about 5 psi and 25 psi (0.34 and 1.72 bars) higher.

However, it should be noted that the pump 10, being of the positive displacement type, will draw down the pressure at the inlet 14a to whatever level is required to generate the volumetric flow rate needed. Therefore, even if the pressure in the reservoir 2 is less than the reactor loop pressure, the effective fluidization of catalyst slurry into a pumpable form will occur as long as the pump 10 is capable of generating the pressure needed to overcome reactor pressure. However, by maintaining the pressure drop across the pump 10 at or slightly above zero, fewer cavities in the pump 10 are needed to create the required pumping pressure, and the internal stator-rotor surfaces of the pump 10 will experience lower wear rates.

Next, the reservoir outlet 5 is opened and the progressive cavity pump 10 is actuated. The viscosity of the mud-like catalyst slurry (which is initially in a settled state at the bottom of the reservoir 2) is quickly lowered as a result of the pressure drop created by the source of pressurized diluent 3 acting on the top surface of the catalyst slurry in the reservoir 2 and, the suction created at the bottom of the reservoir 2 by the pump 10. Specifically, the pressure drop generated by these conditions pulls more diluent into the settled particles of catalyst in the slurry, transforming the mud-like slurry into a less viscous, pumpable slurry that flows from the reservoir outlet 5 to the inlet 14a of the pump stator 12. Additionally, just before entering the stator inlet 14a, the distal end of the rotor 16 agitates the catalyst slurry in the interior 85 of the inlet coupling 64a, ensuring that its viscosity will be lowered to a pumpable level. The progressive cavity pump then continuously conveys the catalyst slurry through the stator outlet 14b and into the outlet pipe 18. Prior to entering the reactor loop 20a, the catalyst slurry is further diluted and transported by means of a pressurized, recycled diluent flush line 21a that delivers diluent at a rate of between about 1 and 5 gallons (3.79 to 19 liters) per minute. Because the diluent flush line 21a is located downstream of the progressive cavity pump 10, there is no opportunity for pump fouling caused by polymerization of monomer impurities in the recycled diluent. The catalyst slurry is then delivered to the reactor loop 20a into the reactor effluent circulated by the loop pump 20b. All during this process, the mass flow meter 50 continuously measures the flow rate of the catalyst slurry exiting the outlet pipe 18. In the event that the measured flow rate diverges from a pre-set flow rate, the mass flow controller 52 adjusts the speed of the pump motor 22 via the variable frequency drive 48 to bring the measured flow rate into keeping with the pre-set flow rate. Alternatively, the catalyst slurry pump 10 can be operated in "speed control mode" with RPM being the controlled variable.

Figure 4:
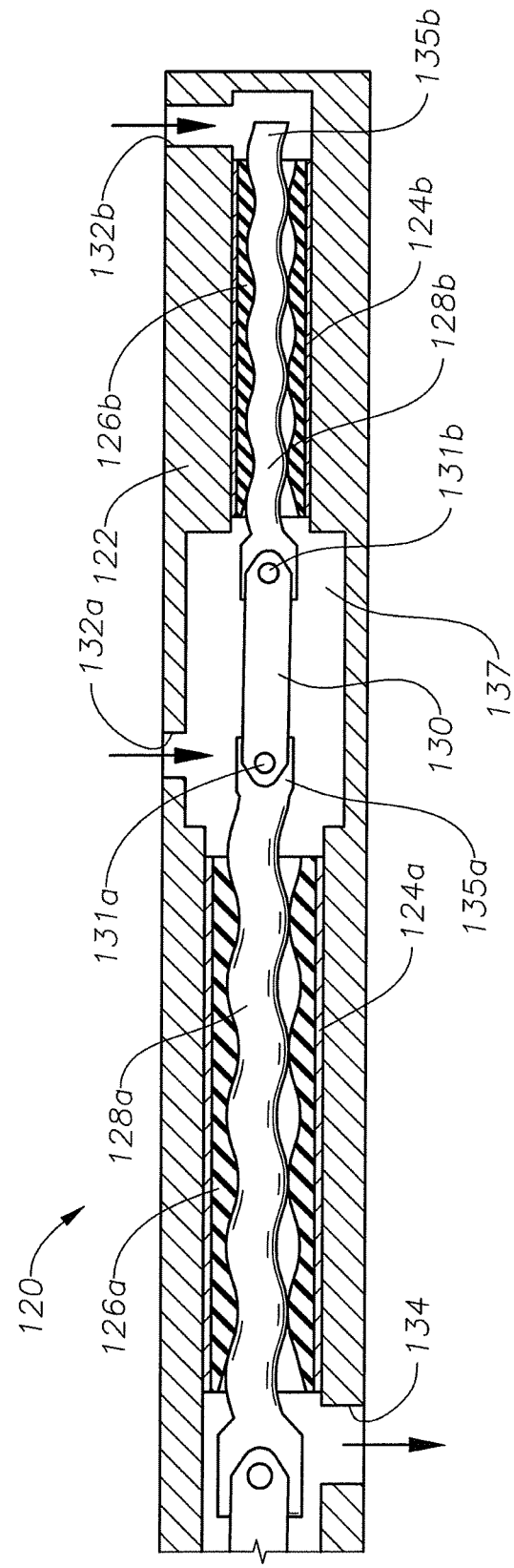
FIG. 4 is a side cross sectional view of the pump stator and dual rotor used in the progressive cavity pump of an alternative embodiment of the system that is capable of mixing a catalyst slurry and a diluent in a fixed volumetric ratio regardless of the rotational speed of the dual rotor.

FIG. 4 illustrates an alternative embodiment 120 of the stator-rotor assembly that may be used in the pump 10 when it is desired to continuously mix the viscous, mud-like catalyst slurry flowing out of the catalyst reservoir 2 with additional diluent prior to delivering the catalyst slurry to the reactor loop 20. The stator-rotor assembly 120 includes a stator outer housing 122, and stator inner housings 124a, 124b of different diameters that accommodate elastomeric sleeves 126a, 126b of different diameters. Two separate rotors 128a, 128b are respectively disposed within the elastomeric sleeves 126a, 126b. These rotors are interconnected by a joint shaft 130 by universal joints 131a, 131b. Dual inlets 132a, 132b are provided at the top of the outer housing 122 for receiving two different liquids, fluids or slurries. As was the case with the single stator-rotor assembly 11, the distal ends 135a, 135b of the each of the rotors 128a, 128b extends beyond its respective elastomeric sleeve 126a, 126b and advantageously serves to agitate any viscous slurry entering the outer housing 122.

In operation, since this is a positive displacement pump, the flow rates of fluids A and B are determined by the geometry and speed of the smaller rotors 128a, 128b and their surrounding stator sleeves 126a, 126b. A mixture of fluids A and B will be discharged from outlet 134. The mixture will be comprised of the same volumetric ratio of fluids A and B regardless of the rotor speed. This alternative embodiment 120 provides a way to pump two fluids at a fixed ratio. This embodiment could be changed to achieve the same result. A dual output worm gearbox could drive each rotor 128a, 128b on opposite sides of the gearbox. Each rotor 128a, 128b would have its own universal joint and the fluids could be combined after they are discharged from the pump. Also, a left hand rotor and a right hand rotor could be used such that the two fluids are pumped toward the central cavity in between the two stators 124a, 124b.

The invention has been described in detail with particular reference to certain preferred embodiments thereof, but it will be understood that variations and modifications can be effected within the spirit and scope of the invention. In particular, while the invention has been specifically described in the context of a slurry loop polyethylene reactor, it is applicable to any reactor producing an effluent comprising a slurry of particulate polymer solids suspended in a liquid medium comprising a diluent and unreacted monomer. Such reaction processes include those which have come to be known in the art as particle form polymerizations. It is also applicable to but not limited to other polyolefin processes such as bulk phase polymerization, stirred slurry polymerization, and gas-phase polymerization. Additionally, although it is not necessary for the catalyst slurry to be agitated in the reservoir 2 for the catalyst feed system 1 to operate, the inventive feed system may be used in conjunction with a stirred or agitated slurry type reservoir if desired.

The invention claimed is:

1. A system for providing a flow of a slurry catalyst into a polyolefin reactor, comprising:
 a reservoir of the slurry catalyst having an outlet; and
 a progressive cavity pump including a stator having an inlet, an outlet, a outer stator housing, an inner stator housing, an annular space between the outer stator housing and the inner stator housing such that the two housings are concentric but non-contacting, and a rotor;
 wherein the stator inlet is connected to said reservoir outlet to create a pressure drop across the slurry catalyst, the stator outlet is connected to the polyolefin reactor, and the rotor rotates within the stator to provide the flow of the slurry catalyst through said stator outlet;
 wherein the slurry catalyst includes a diluent, and wherein the annular space is connected to the inlet via an annular opening that is sized and configured so as to allow substantially only the diluent into the annular space; and
 wherein the progressive cavity pump produces a continuous flow of the slurry catalyst to the polyolefin reactor.

2. The system defined in claim 1, further comprising a catalyst agitator provided between the reservoir outlet and the stator inlet that lowers the viscosity of the catalyst slurry flowing into said pump stator.

3. The system defined in claim 2, wherein said catalyst agitator is formed from a distal portion of said rotor that extends beyond said stator.

4. The system defined in claim 1, wherein said progressive cavity pump further includes a motor having an output shaft, and a drive train connected to said motor output shaft that provides a drive torque to a proximal end of said rotor.

5. The system defined in claim 4, wherein said drive train is incapable of rotating in response to torque applied to said rotor from either pressurized catalyst slurry or pressurized reactor contents.

6. The system defined in claim 5, wherein said drive train includes a worm gear that transmits torque from said motor shaft to said proximal end of said rotor.

7. The system defined in claim 4, further comprising a mass flow meter downstream of said pump outlet for measuring the flow of the catalyst discharged by said pump.

8. The system defined in claim 7, further comprising a digital controller operably connected to an output of said mass flow meter and to said motor for adjusting a motor speed to maintain a preselected flow rate of catalyst.

9. The system defined in claim 4, wherein said progressive cavity pump further includes a drive shaft connected between an output shaft of said drive train and a proximal end of said rotor, and a mechanical seal surrounding the drive shaft that provides a barrier to said pressurized catalyst.

10. The system defined in claim 9, wherein said mechanical seal includes a bushing connected to a source of pressurized catalyst diluent to prevent entry of catalyst into said mechanical seal.

11. The system defined in claim 9, wherein said mechanical seal is a dual tandem mechanical seal.

12. The system defined in claim 1, wherein the polyolefin reactor is a slurry polymerization reactor.

13. A system for providing a flow of a slurry catalyst into a polyolefin reactor, comprising:
 a reservoir of settled slurry catalyst having an outlet, said outlet being pressurized to a level above an internal pressure of the polyolefin reactor;
 a progressive cavity pump including a stator having an inlet connected to said reservoir outlet that creates a pressure drop across the slurry catalyst in the reservoir, and an outlet connected to the polyolefin reactor, and a rotor that rotates within the stator that provides the flow of the slurry catalyst through said stator outlet;

an annular space connected to the inlet via an annular opening and located between the outer stator housing and the inner stator housing such that the two housings are concentric but non-contacting wherein the slurry catalyst includes a diluent and the annular opening is sized and configured so as to allow substantially only the diluent into the annular space and a catalyst agitator disposed between the reservoir outlet and the pump inlet that lowers the viscosity of slurry catalyst flowing through said pump inlet into said pump stator.

14. The system defined in claim 13, wherein the progressive cavity pump produces a flow of slurry catalyst to the polyolefin reactor.

* * * * *